United States Patent [19]
Charron

[11] 3,765,452
[45] Oct. 16, 1973

[54] PROPORTIONAL CONTROL VALVE FOR GAS BURNERS

[75] Inventor: Jean-Claude Charron, Saint-Maur, France

[73] Assignee: Saunier Duval, Paris, France

[22] Filed: Feb. 28, 1972

[21] Appl. No.: 229,765

[30] Foreign Application Priority Data
Mar. 2, 1971 France .............................. 7107086

[52] U.S. Cl. .......... 137/630.15, 91/429, 137/630.19, 251/30, 251/45
[51] Int. Cl. .......................................... F16k 31/365
[58] Field of Search ................... 137/82, 85, 630.15, 137/630.19; 251/30, 45; 91/429

[56] References Cited
UNITED STATES PATENTS
3,433,262   3/1969   Ray ................................ 251/30 X
3,017,863   1/1962   Uhlman et al. .................... 91/429 X
3,118,471   1/1964   Wright ........................... 137/630.19
3,216,440   11/1965  Kohman ................................ 137/82

*Primary Examiner*—Robert G. Nilson
*Attorney*—Herbert W. Kenway et al.

[57] ABSTRACT

In the burner control valve construction disclosed herein, a modulating throttle valve is positioned by a diaphragm. One side of the diaphragm is exposed to the gas inlet pressure while the pressure on the other side of the diaphragm is controlled by varying the duty cycle at which gas is alternately admitted and vented from the space adjacent the diaphragm, the admitting and venting of gas being controlled by an electromagnet energized by a suitable squarewave signal of adjustable duty cycle.

6 Claims, 1 Drawing Figure

PATENTED OCT 16 1973 3,765,452
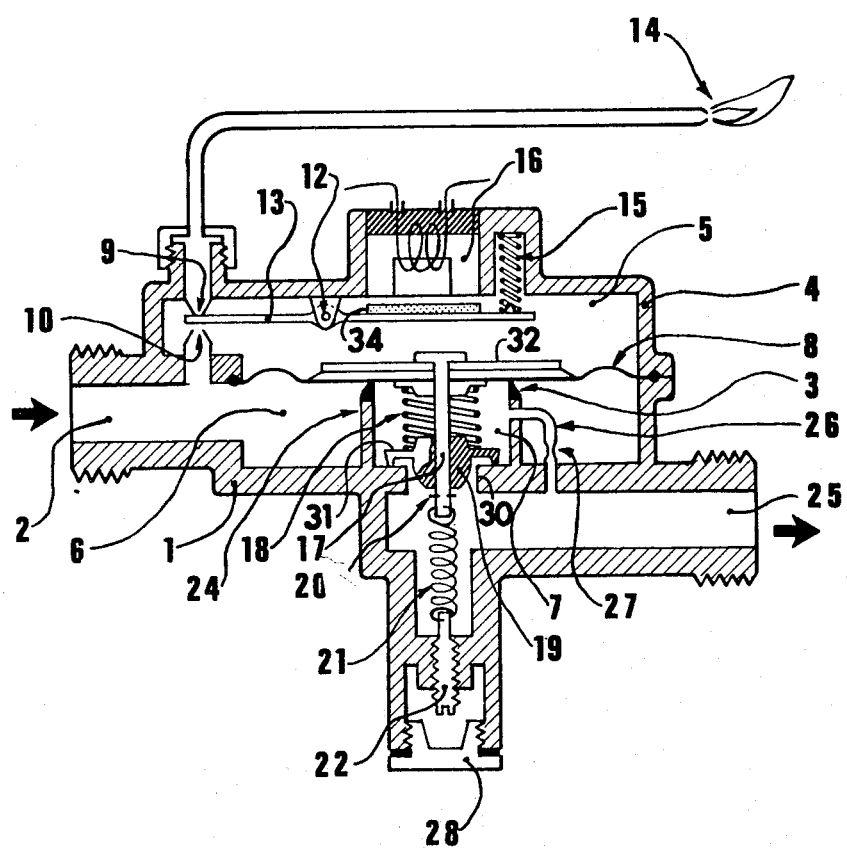

PROPORTIONAL CONTROL VALVE FOR GAS BURNERS

BACKGROUND OF THE INVENTION

This invention relates to control valves for gas burners and more particularly to such a valve in which the gas flow may be varied or adjusted so as to permit proportional control.

It has previously been known to construct a regulator type of valve employing a force balance diaphragm in which control over the main flow through the valve can be exercised by modulating a pilot flow. While this construction achieves a force gain or multiplication, it is still necessary to provide a linear or proportional control of the pilot flow in order to obtain an overall proportional control effect. It has also been known to employ an electromatically operated pilot valve to open and close a pilot valve so as to in turn open and close a diaphragm operated valve. These latter constructions, however, have typically provided only ON/OFF control or, at most, a fixed intermediate or trickle level of flow.

Among the several objects of the present invention may be noted the provision of a gas control valve which provides proportional control of gas flow; the provision of such a valve in which the gas flow is controllable electrically by means of a signal at relatively low power; and the provision of such a valve which is of relatively simple and inexpensive construction and which is highly reliable. Other objects and features will be in part apparent and in part pointed out hereinafter.

SUMMARY OF THE INVENTION

Briefly, the gas control valve of the present invention employs a throttle valve mechanism which is operated by a diaphragm, one side of the diaphragm being in communication with the gas inlet and the other side being open to a chamber in which the pressure is controlled to effect movement of the diaphragm. The pressure in this second chamber is adjusted by a pilot valve which in turn is operated by electromotive means responsive to a control signal of the type which alternates between first and second predetermined states, i.e. a squarewave. In the first state of the signal, gas is admitted from the inlet to the second chamber and in the second state, gas is vented from the second chamber. The size of the chamber is sufficiently large in relation to the rates at which gas is admitted to and vented from the second chamber so that fluctuations in the second chamber pressure at the control signal frequency are substantially damped. Accordingly, the pressure in the second chamber is variable as a function of the duty cycle of the control signal and the gas flow through the valve is likewise controllably variable.

DESCRIPTION OF THE PREFERRED EMBODIMENT

Referring now to the single FIGURE of the drawings which illustrated a valve constructed in accordance with the present invention, the gas control valve illustrated there employs a housing 1 and is adapted to control the flow of gas between an inlet 2 and an outlet 25. Flow through the valve between inlet 2 and outlet 25 is controlled by a vlave mechanism which is operated by a diaphragm 8. The lower surface of diaphragm 8 is, for the most part, exposed to a chamber 6 which is in communication with inlet 2, while the upper side of the diaphragm 8 is exposed to a second or control chamber 5.

Diaphragm 8 carries an axial rod 17 which is biased downwardly by a tension spring 21. Tension in spring 21 is adjustable by means of a screw 22, access to the screw 22 being had through a plug 28 in housing 1. A throttle valve member 19 is slidable vertically on rod 17 to an extent limited by a stop 20 on the rod thereby providing a lost-motion connection. This member 19 is biased downwardly relative to the diaphragm and the rod 27 by means of a spring 18. The throttle valve member 19 cooperates with a port 30 in the housing 1 to form a throttle opening of variable cross-sectional area. As illustrated, the lower portion of throttle member 19 is rounded so that the throttle opening increases as the member 19 is raised relative to the housing. Member 19 includes a series of radially extending legs 31 which engage the housing as illustrated and limit the downward movement of the throttle member so that a predetermined minimum throttle opening is provided when the throttle member is in its lowermost position as illustrated in the drawing.

Diaphragm 8 also carries a stiff center plate 32 which co-operates with a seat 3 formed in the valve housing 1 to form a valve which can be completely closed to completely block flow from inlet 2 to outlet 25. The chamber 7 between the completely shutable valve and the throttle valve is bypassed by a metering orifice 27. The area of this bypass is selected, in conjunction with the minimum throttle valve area, to provide a minimal gas flow appropriate for initial lighting of the burner or to establish a minimum thermal output of the burner. If desired, an adjustment screw may be provided at this point for flow level adjustment.

A calibrated orifice 10 is provided for admitting gas from inlet 2 into the control chamber 5 and a second calibrated orifice 9 is provided, in alignment with orifice 10, for venting gas from the control chamber. The venting orifice 9 may be connected, as illustrated, to a pilot flame 14 for burning off the vented gas. One arm of a lever 13, pivoted at 12, extends into the space between the two orifices and is arranged so that, as the lever is rocked, one of the orifices is blocked while the other is open to control chamber 5.

An electromagnet 16 operates on an armature 34 which is mounted on the opposite arm of lever 13 and spring 15 biases the lever 13 so that the armature 34 is normally held away from the electromagnet 16. In this position, the orifice 9 is blocked and the orifice 10 is open. The parameters of the electromagnet 16 and armature 34 are selected so that the electromotive means thereby formed responds relatively quickly and accurately to squarewave control signals, i.e. signals which alternate between one state and another at a substantially predetermined frequency. In one state of the control signal, i.e. when a substantial voltage is applied to the electromagnet, the armature 34 is attracted so that the orifice 10 is closed while the orifice 9 is open. Conversely, in the second state of tje control signal, i.e. when substantially no voltage is applied to the electromagnet, the bias provided by spring 15 closes the orifice 9 and opens the orifice 10.

The size of the chamber 5 is selected in relation to the sizes of the calibrated orifices 9 and 10 and the nominal frequency of the squarewave control signal so that the pressure in chamber 5 does not fluctuate appreciably within each cycle of the control signal. In other words, the input and output pulsations are damped or filtered. On the other hand, it can be seen that the average or steady state pressure within the chamber 5 will depend upon the proportion of time that the orifice 10 is open in relation to the proportion of time the orifice 9 is open. In that the electromagnet responds relatively quickly to change in state of the control signal, it can be seen that these time proportions will be variable as a function of the duty cycle with the applied control signal, i.e. the percentage of time the signal spends in one state, relative to the overall cycle period. Thus, the pressure within the chamber 5 is variable as a function of the duty cycle of the control signal.

As the duty cycle of the control signal is increased so the proportion of time during which the chamber 5 is vented through the orifice 9 is also increased, the pressure within the chamber 5 will drop and the diaphragm plate 32 will be lifted from its seat 3. At this point, a valve opening of relatively large size, i.e. the entire circumference of the seat 3, will be opened and the small chamber 7 will equalize with the inlet pressure. At this point then, the flow will be equal to the predetermined minimum flow which will pass by the throttle valve member 19 and through the bypass 26. Thus ignition may proceed in conventional manner. A further reduction in the pressure within chamber 5, under the influence of a control signal of increasing duty cycle, will cause the rod 17 to rise further, lifting the throttle valve chamber 19 as it is engaged by the stop 20. The lifting of the throttle member 19 then provides a progressive increase in throttle opening area as the diaphragm 8 rises further in response to reduced pressure within the chamber 5. Since the throttle opening, and therefore the gas flow through the valve, is variable in response to corresponding variation in pressure within the control chamber 5, it can be seen that the valve of the present invention is capable of providing a true proportional control.

In summary, energization of the electromagnet 16 by a squarewave control signal will produce an initial flow at a predetermined desired level for ignition purposes and thereafter the gas flow through the valve will be variable substantially as a proportional function of the duty cycle of the control signal. Thus, true proportional control may be obtained, e.g. for use in a feedback loop.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A gas control valve providing proportional control of gas flow between an inlet and an outlet, said valve comprising:
    a diaphragm;
    on one side of said diaphragm a first chamber which is in communication with said inlet and, on the other side of said diaphragm, a second chamber;
    a throttle valve for controlling the passage of gas from said inlet to said outlet, said throttle valve having at least one movable member mechanically coupled to said diaphragm with the flow of gas through the throttle valve being thereby controllable as a function of the position of said diaphragm;
    electromotive means which is responsive to a control signal which alternates between first and second states at a substantially predetermined frequency and variable duty cycle; and
    pilot valve means controlled by said electromotive means for admitting gas from said inlet to said second chamber when said control signal is in said first state and for venting gas from said second chamber when said control signal is in said second state, said second chamber being sufficiently large in relation to the rate at which gas is admitted to and vented from said second chamber that fluctuations in the second chamber pressure at said frequency are substantially damped and the pressure in said second chamber is variable as a function of the duty cycle of said control signal whereby the gas flow through said valve is also variable as a function of the duty cycle of said control signal.

2. A gas control valve providing proportional control of gas flow between an inlet and an outlet, said valve comprising:
    a diaphragm;
    on one side of said diaphragm a first chamber which is in communication with said inlet and, on the other side of said diaphragm, a second chamber;
    a fully closable valve coupled to said diaphragm; a throttle valve for controlling the passage of gas from said inlet to said outlet, said throttle valve having at least one movable member mechanically coupled to said diaphragm through a lost motion connection, said throttle valve providing a predetermined minimum gas flow at the initial position of said member with the flow of gas through the throttle valve being thereafter controllable as a function of the position of said diaphragm;
    a first calibrated orifice for admitting gas from said inlet to said second chamber;
    a second calibrated orifice for venting gas from said second chamber; and
    a lever which can be oscillated between a first position in which said first orifice is blocked and said second orifice is open and a second position in which said second orifice is blocked and said first orifice is open; and
    electromotive means, responsive to a control signal which alternates between first and second states at a substantially predetermined frequency and variable duty cycle, for substantially synchronously rocking said lever between its first and second positions, said second chamber being sufficiently large in relation to the rate at which gas is admitted to and vented from said second chamber that fluctuations in the second chamber pressure at said frequency are substantially damped and the pressure in said second chamber is variable as a function of the duty cycle of said control signal whereby, after an initial flow of minimum volume is established, the gas flow through said valve is variable as a function of the duty cycle of said control signal.

3. A gas control valve as in claim 2 wherein the throttle valve movable member is slidable on a rod extending from said diaphragm to an extent determined by a fixed stop on the rod.

4. A gas control valve as in claim 2 including a bypass around said throttle valve from the space between said fully closable valve and said throttle valve and said outlet.

5. A gas control valve as in claim 2 wherein said throttle valve movable member provides a predetermined minimum opening permitting a minimum flow suitable for ignition of a burner.

6. A gas control valve as in claim 2 wherein said throttle valve movable member includes a taper portion providing a progressively increasing throttle opening as said member is moved by said diaphragm.

* * * * *